US010523348B2

(12) United States Patent
Zhu et al.

(10) Patent No.: US 10,523,348 B2
(45) Date of Patent: Dec. 31, 2019

(54) UPLINK SIGNAL TO INTERFERENCE PLUS NOISE RATIO ESTIMATION FOR MASSIVE MIMO COMMUNICATION SYSTEMS

(71) Applicant: Ping Liang, Newport Coast, CA (US)

(72) Inventors: Dengkui Zhu, Wanyuan (CN); Boyu Li, Irvine, CA (US); Ping Liang, Newport Coast, CA (US)

(73) Assignee: RF DSP INC., Irvine, CA (US)

( * ) Notice: Subject to any disclaimer, the term of this patent is extended or adjusted under 35 U.S.C. 154(b) by 0 days.

(21) Appl. No.: 15/537,879

(22) PCT Filed: Jan. 16, 2016

(86) PCT No.: PCT/US2016/013752
§ 371 (c)(1),
(2) Date: Jun. 19, 2017

(87) PCT Pub. No.: WO2016/115549
PCT Pub. Date: Jul. 21, 2016

(65) Prior Publication Data
US 2018/0006743 A1    Jan. 4, 2018

Related U.S. Application Data

(60) Provisional application No. 62/104,644, filed on Jan. 16, 2015.

(51) Int. Cl.
| | |
|---|---|
| *H04L 1/00* | (2006.01) |
| *H04B 17/336* | (2015.01) |
| *H04L 1/20* | (2006.01) |
| *H04B 7/0417* | (2017.01) |
| *H04B 7/0413* | (2017.01) |

(Continued)

(52) U.S. Cl.
CPC ......... *H04B 17/336* (2015.01); *H04B 7/0417* (2013.01); *H04L 1/20* (2013.01); *H04L 1/206* (2013.01); *H04B 7/0413* (2013.01); *H04B 7/0452* (2013.01); *H04B 7/0626* (2013.01); *H04L 5/0023* (2013.01); *H04L 5/0048* (2013.01); *H04L 25/0204* (2013.01)

(58) Field of Classification Search
CPC .. H04B 17/336; H04B 7/0417; H04B 7/0452; H04B 7/0626; H04B 7/0413; H04L 1/206; H04L 1/20; H04L 25/0204; H04L 5/0023; H04L 5/0048
USPC ........................................................ 370/252
See application file for complete search history.

(56) References Cited

U.S. PATENT DOCUMENTS

| | | | | |
|---|---|---|---|---|
| 2006/0270416 | A1* | 11/2006 | Perets | H04L 5/023 455/452.2 |
| 2007/0183544 | A1* | 8/2007 | Lee | H04B 1/123 375/346 |

(Continued)

*Primary Examiner* — Mang Hang Yeung
(74) *Attorney, Agent, or Firm* — Guosheng Wang; United States Research and Patent Firm

(57) ABSTRACT

This invention presents methods for estimating the uplink SINR and channel estimation error level in MU-MIMO wireless communication systems comprising the BS obtaining the channel coefficients between each receiving antenna of a BS and a transmitting antenna of a UE in the uplink; for the BS estimating the SU-MIMO SINR of a UE using the channel coefficients between a UE and the BS; for the BS estimating the channel estimation error level of a UE using the channel coefficients between a UE and the BS.

11 Claims, 4 Drawing Sheets

(51) Int. Cl.
  *H04B 7/0452* (2017.01)
  *H04B 7/06* (2006.01)
  *H04L 5/00* (2006.01)
  *H04L 25/02* (2006.01)

(56) References Cited

U.S. PATENT DOCUMENTS

| | | | | |
|---|---|---|---|---|
| 2008/0187077 | A1* | 8/2008 | Matza | H04B 3/487 |
| | | | | 375/347 |
| 2009/0129489 | A1* | 5/2009 | Eldar | H04L 25/023 |
| | | | | 375/260 |
| 2010/0008216 | A1* | 1/2010 | Li | H04L 5/0048 |
| | | | | 370/208 |
| 2012/0063336 | A1* | 3/2012 | Shany | H04B 7/0452 |
| | | | | 370/252 |
| 2014/0269609 | A1* | 9/2014 | Li | H04L 1/0003 |
| | | | | 370/330 |
| 2014/0369283 | A1* | 12/2014 | Ge | H04B 7/0452 |
| | | | | 370/329 |
| 2015/0124688 | A1* | 5/2015 | Xu | H04B 7/0452 |
| | | | | 370/312 |

* cited by examiner

UPLINK SIGNAL TO INTERFERENCE PLUS NOISE RATIO ESTIMATION FOR MASSIVE MIMO COMMUNICATION SYSTEMS

This application claims the benefit of U.S. Provisional Application No. 62/104,644 filed on Jan. 16, 2015.

FIELD OF THE INVENTION

The field of the invention relates to wireless communication, and more specifically, to Signal to Interference plus Noise Ratio (SINR) and Channel State Information (CSI) error level estimations in the uplink transmission of OFDMA wireless communications and more particularly to Massive MIMO systems.

BACKGROUND OF THE INVENTION

Massive MIMO systems scale up conventional MIMO systems by possibly orders of magnitude, i.e., hundreds of antennas at a Base-Station (BS) to simultaneously serve tens of User Equipments (UEs) in the same time-frequency resource. Such a system may provide tremendous advantages in spectral efficiency. With the capabilities of aggressive spatial multiplexing and great array gains, a massive MIMO system may achieve capacity increase and energy efficiency improvement simultaneously. In addition, it can be built with inexpensive and low-power components. It also has the potential to significantly reduce the latency of the air interface, simplify the media access layer, as well as increase the robustness to both unintentional artificial interference and intended jamming. In general, massive MIMO systems are considered in Time Division Duplexing (TDD) mode, taking advantages of the channel reciprocity between the uplink and downlink, although Frequency Division Duplexing (FDD) is arguably possible. Moreover, Orthogonal Frequency Division Multiplexing (OFDM) is still the best technology to multiplex UEs in the whole bandwidth like the $4^{th}$ Generation (4G) communication systems as it is very suitable for the MIMO system. Therefore, massive MIMO combining with OFDM would increase spectrum efficiency more than ten times of the conventional systems with a relatively simple implementation.

When massive MIMO is employed in the TDD communication systems, the downlink channel between the BS and UEs are estimated through the uplink pilot or sounding reference signal (SRS) transmitted by each UE by making use of the channel reciprocity of TDD systems. In addition to the CSI, the SINRs of the uplink and downlink of each UE also have to be estimated so that the BS can predict the achievable transmission rate and select the proper modulation and code scheme (MCS) for each UE. Even though, the estimated SINR cannot reflect the channel quality of each UE in a MU-MIMO user group accurately because of the unavoidable CSI estimation error. Hence, the CSI error level of each UE is also required so that the SINR decrease caused by CSI error can be approximated and incorporated when selecting the MCS for a UE. Due to the above reasons, this invention provides methods to estimate the SINR and the CSI error level of each UE based on the estimated uplink channel coefficients of each UE.

This invention presents embodiments that provide the signal transmission, detection methods and the relative processes for the downlink and uplink transmission in massive MIMO systems.

OBJECT OF THE INVENTION

It is an object of this invention to provide methods to estimate the uplink SINR and CSI error level for massive MIMO systems.

The other object of this invention is to specify certain SRS sequences helpful to the SINR and CSI error level estimations.

SUMMARY OF THE INVENTION

As shown in FIG. 1, after the BS receives the SRS on the dedicated OFDM symbols, it begins 1 when the BS estimates the channel coefficient on each SRS subcarrier between each UE and itself 2. After that, the BS estimates the time offset (TO) and frequency offset (TO) of each UE and compensates these two offsets contained in the estimated channel coefficients 3. After that, the BS uses the corrected coefficients to estimate the uplink SINR and downlink SINR of each UE respectively 4 and comes to the end 5. Moreover, the CSI error level of each UE is also estimated. When two SRS symbols are reserved for each UE in an uplink subframe, the two root sequences on the same comb should be different in these OFDM symbols to enhance the SINR estimation accuracy.

BRIEF DESCRIPTION OF THE DRAWINGS

The aforementioned implementation of the invention as well as additional implementations would be more clearly understood as a result of the following detailed description of the various aspects of the invention when taken in conjunction with the drawings. Like reference numerals refer to corresponding parts throughout the several views of the drawings.

DETAILED DESCRIPTION OF THE PREFERRED EMBODIMENTS

Figure 1:
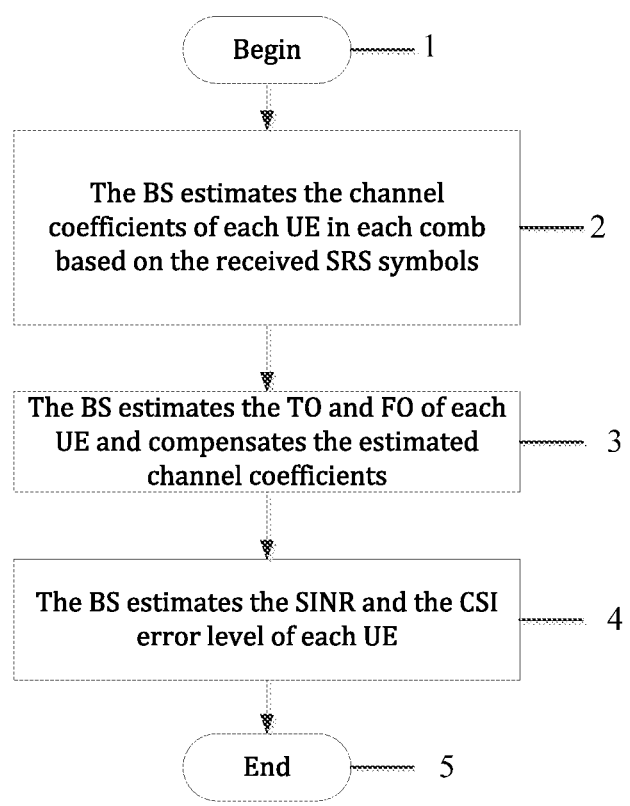
FIG. 1 illustrates the processing of CSI and SINR estimation
Figure 2:
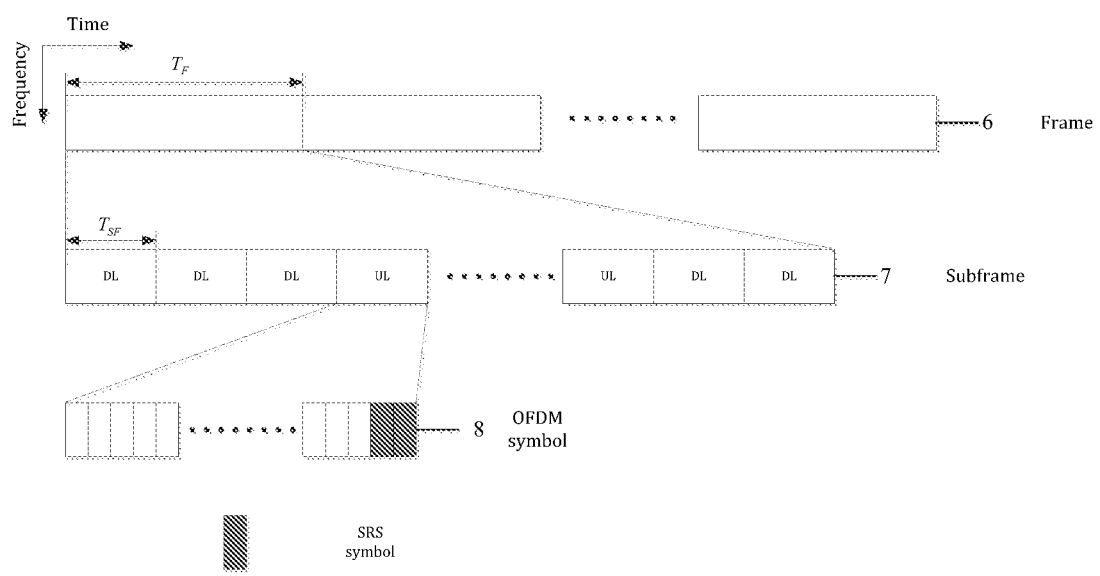
FIG. 2 illustrates the structure of the radio time-frequency resource.
Figure 3:
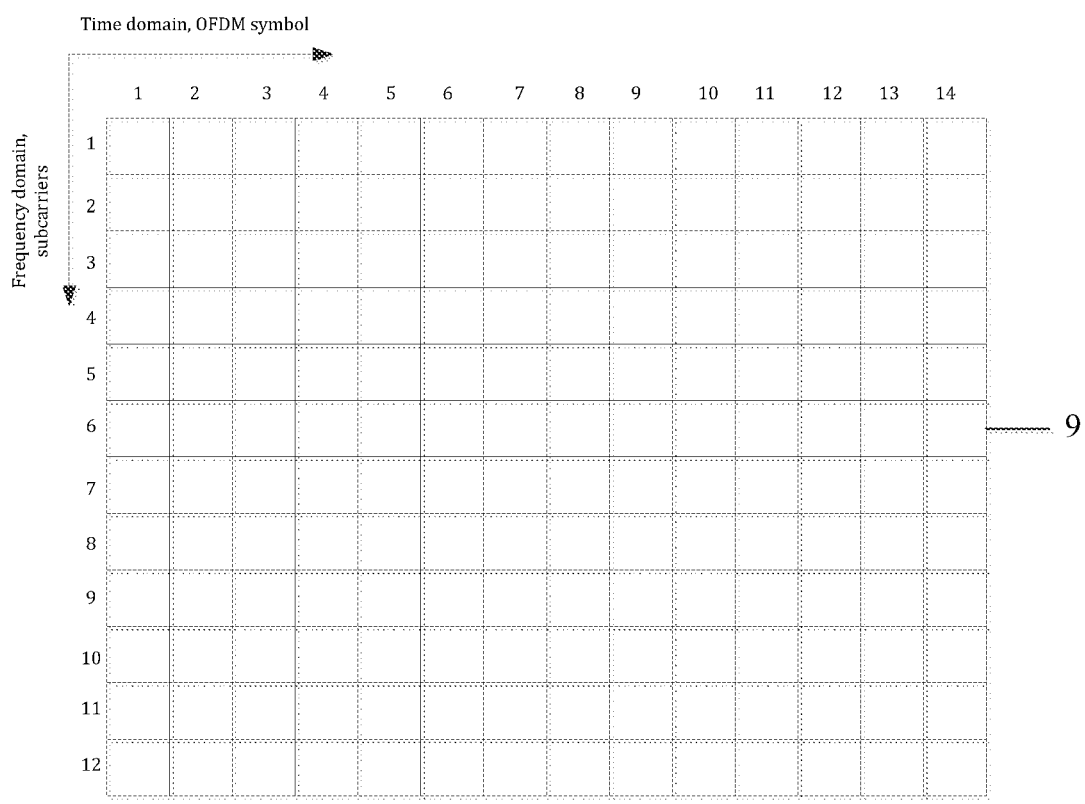
FIG. 3 illustrates the structure of a resource block.

For a massive MU-MIMO OFDM communication systems, where the TDD mode is employed for uplink and downlink transmission multiplexing. The radio resource (time and frequency domains) allocation to the uplink and downlink is shown in FIG. 2, where the resource is organized in units of frame consisted of the whole bandwidth in the frequency domain and consecutive time duration denoted by $T_F$ in the time domain. One frame is divided into n subframes further, among which $n_1$ and $n_2=n-n_1$ subframes are reserved for the downlink and uplink transmission respectively. Note that the numbers and the indices of downlink and uplink subframes are configurable in a frame. One subframe is consisted of $N_{sym}$ OFDM symbols in the time domain. FIG. 2 shows an example of the structures of frame 6 and subframe 7. One subframe 7 is consisted of multiple Resource Blocks (RBs), where one RB is consisted of $N_{sc}$ consecutive subcarriers in the frequency domain, e.g., $N_{sc}=12$ in 3GPP-LTE/LTE-A, and all the SC-OFDM/OFDM symbols 8 in the time domain. One subcarrier in a symbol is called a Resource Element (RE), which is the smallest data transmission unit. FIG. 3 shows an example of RB structure 9, where $N_{sc}=12$ and $N_{sys}=14$, and a rectangle denotes one RE. The number of RBs and so subcarriers used in one subframe depends on the channel bandwidth as shown in Table 1 below.

TABLE 1

| LTE Channel Bandwidth | Number of RBs | Number of subcarriers per symbol |
|---|---|---|
| 1.4 MHz | 6 | 72 |
| 3 MHz | 15 | 180 |
| 5 MHz | 25 | 300 |
| 10 MHz | 50 | 600 |
| 15 MHz | 75 | 900 |
| 20 MHz | 100 | 1200 |

The uplink SRS values for each UE are allocated to these subcarriers. The number of SC-OFDM/OFDM symbols reserved for SRS is one or two for each UE in a uplink subframe, which depends on the resource allocation by the BS. In order to multiplex more UEs to transmit SRS on the same symbol, two stratagems can be employed: (1). The whole frequency band is divided into several sections where each one contains a set of continuous subcarriers; (2). The subcarriers in each section can be divided into several groups, where each group is called a comb. The numbers of sections and the combs are configurable according to the specific application scenario. Multiple UEs are multiplexed in one comb through different cyclic shift version of a root sequence, e.g., for a specific comb, the SRS sequences sent by all UEs in one comb, $r_{u,v}^{\alpha}(n)$ is defined by a cyclic shift $\alpha$ of a root sequence $\bar{r}_{u,v}(n)$ according to $$r_{u,v}^{\alpha}(n) = e^{j\alpha n}\bar{r}_{u,v}(n), \quad 0 \leq n \leq M_{sc}^{SRS}, \quad (1)$$

where $\bar{r}_{u,v}(n)$ is the root sequence with Constant Amplitude Zero Auto Correlation (CAZAC) and $M_{sc}^{SRS}$ is the length of the root sequence, which equals to the number of subcarriers contained in the comb. Note that the indices u and v uniquely determines the root sequence. Although the SRS transmitted by different UEs in one comb are superposed at the receiver, the channel between each UE and the BS can be almost perfectly separated because of the unique value of $\alpha$ used by each UE.

When two SRS symbols are reserved for each UE in a subframe, the root sequence of a comb in the first symbol should be different from that of the second symbol, which ensures the accuracy of the SINR estimation. This can be realized by a pre-defined root sequence allocation, e.g., the indices u and v are determined by the cell identification and the SRS symbol index in a subframe, or other ways, e.g., the BS allocates u, v, and informs the involved UEs through the downlink control channel.

When the BS received the SRS, it first estimates the channel coefficients between each receive antenna and each UE with the methods such as in [1]. With these estimated channel coefficients, it estimates the TO and FO of each UE and corrects them by compensates the TO and FO contained in the estimated channel coefficients respectively. After that, the BS estimates the uplink SINR of each UE.

Figure 4:
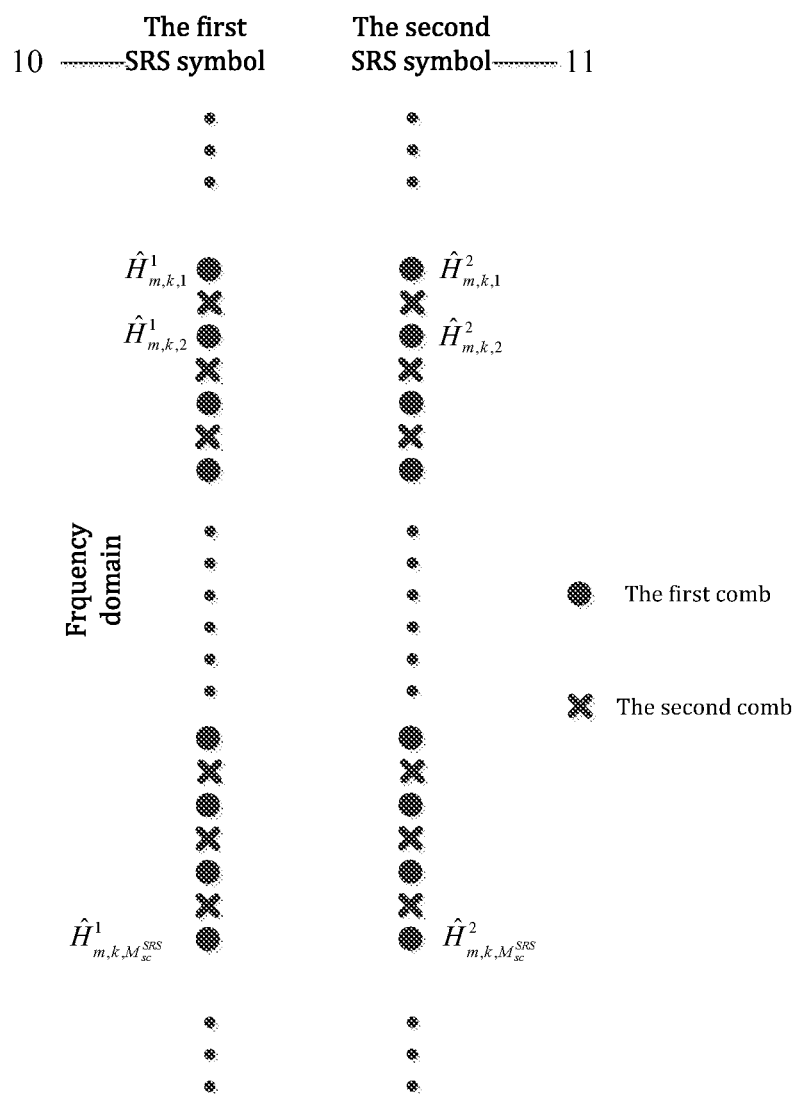
FIG. 4 illustrates the structure of the combs in the SRS symbols.

FIG. 4 is an example of SRS transmission, where two symbols 11,12 are reserved for SRS in uplink subframe. In this example, we assume the number of comb in one section is 2, where K UEs, each UE with a single transmit antenna, are multiplexed on each comb. Let M denote the number of receive antenna at the BS side, then after correcting the TO and FO, the channel coefficient between the $k^{th}$ UE and the $m^{th}$ antenna on the $i^{th}$ subcarrier is denoted by $\hat{H}_{m,k,i}^{t}$ in a specific comb, where $t=1, 2, m=1, \ldots, M, k=1, \ldots, K$ and $i=1, \ldots, M_{sc}^{SRS}$. Note that the following descriptions are based on this example but it would not limit the application of the invention.

For the $k^{th}$ UE, the BS first selects the subcarriers set $\Omega_{est,k}$ in a comb, e.g., the subcarriers of a comb except these located on the two boundary frequency band and $|\Omega_{est,k}|=M_{sc}^{SRS}-N_{dis}$, where $|\Omega_{est,k}|$ where $|\Omega_{est,k}|$ denotes the cardinality of $\Omega_{est,k}$ and $N_{dis}$ is the number of subcarriers discarded. Then, the noise and interference power of $k^{th}$ UE can be estimated as $$\hat{P}_{NI} = \frac{1}{2MK|\Omega_{est,k}|}\sum_{m=1}^{M}\sum_{k=1}^{K}\sum_{i\in\Omega_{est,k}}|\hat{H}_{m,k,i}^{t} - \hat{H}_{m,k,i+1}^{t}|^{2}. \quad (2)$$

With (2), the signal power of the $k^{th}$ UE on the $m^{th}$ antenna is estimated as $$\hat{P}_{S}^{m,k} = \frac{1}{2|\Omega_{est,k}|}\sum_{t=1}^{2}\sum_{i\in\Omega_{est,k}}|\hat{H}_{m,k,i}^{t} - \hat{H}_{m,k,i+1}^{t}|^{2} - \hat{P}_{NI}. \quad (3)$$

Obviously, the SINR of the $k^{th}$ UE on the $m^{th}$ antenna can be directly calculated as $$SINR_{ant}^{m,k} = \frac{\hat{P}_{S}^{m,k}}{\hat{P}_{NI}}. \quad (4)$$

In practical systems, the SINR or channel quality indication (CQI) of each UE has to be estimated for transmission rate prediction. The ideal uplink SU-MIMO SINR in a specific frequency band, e.g., the subcarrier set $\Omega \in \Omega_{est,k}$, defined as $$SINR_{k}^{SU,\Omega} = \frac{\sum_{t=1}^{2}\sum_{m=1}^{M}\sum_{i\in\Omega}|H_{m,k,i}^{t}|^{2}}{2|\Omega|\sigma_{NI}^{2}}, \quad (5)$$

where $\sigma_{NI}^{2}$ is the ideal interference plus noise power. In the practical systems, $\sigma_{NI}^{2}$ and $\hat{P}_{NI}$ has the following approximation relation $$\sigma_{NI}^{2} \approx K\hat{P}_{NI}, \quad (6)$$

based on the CSI estimation process. For the channel gain $$\sum_{t=1}^{2}\sum_{m=1}^{M}\sum_{i\in\Omega}|H_{m,k,i}^{t}|^{2},$$

it is approximated as $$\sum_{t=1}^{2}\sum_{m=1}^{M}\sum_{i\in\Omega}|H_{m,k,i}^{t}|^{2} \approx \sum_{t=1}^{2}\sum_{m=1}^{M}\sum_{i\in\Omega}|\hat{H}_{m,k,i}^{t}|^{2} - 2M|\Omega|\hat{P}_{NI}. \quad (7)$$

Hence, the SINR can be estimated as $$\widetilde{SINR}_k^{SU,\Omega} = \frac{\sum_{t=1}^{2}\sum_{m=1}^{M}\sum_{i\in\Omega}|\hat{H}_{m,k,i}^t|^2 - 2M|\Omega|\hat{P}_{NI}}{2|\Omega|K\hat{P}_{NI}} \quad (8)$$

on the subcarrier set $|\Omega|$.

When used to approximate the uplink data SINR on the subcarrier set $\Omega$, some adjustments have to made since the transmit power of data may different from that of the SRS, e.g., $\widetilde{SINR}_k^{UL,\Omega} = D^{UL}\widetilde{SINR}_k^{SU,\Omega}$.

Since there exists unavoidable interference and noise in the estimated channel coefficients, the CSI error level is used to measure how much the estimated channel vector of a UE deviates from the ideal vector. More specifically, the CSI error level is defined as normalized correlation between the ideal and estimated channel vector $$\alpha_k = E_i\left[\frac{|\hat{H}_{k,i}^{t,H}H_{k,i}^t|}{\|\hat{H}_{k,i}^t\|_2\|H_{k,i}^t\|_2}\right], \quad (9)$$

where $H_{k,i}^t$ and $\hat{H}_{k,i}^t$ are the ideal and estimated channel vectors defined by $\hat{H}_{k,i}^t = [\hat{H}_{1,k,i}^t \ldots \hat{H}_{M,k,i}^t]^T$ and $H_{k,i}^t = [H_{1,k,i}^t \ldots H_{M,k,i}^t]^T$ respectively. With (2) and (3), $\alpha_k$ is estimated as $$\alpha_k = \left(\frac{\sum_{m=1}^{M}\hat{P}_S^{m,k}}{M\hat{P}_{NI} + \sum_{m=1}^{M}\hat{P}_S^{m,k}}\right)^{1/2} \quad (10)$$

With $\alpha_k$, the BS can accommodate the effect of non-ideal CSI when select the MCS for each UE.

Although the foregoing descriptions of the preferred embodiments of the present inventions have shown, described, or illustrated the fundamental novel features or principles of the inventions, it is understood that various omissions, substitutions, and changes in the form of the detail of the methods, elements or apparatuses as illustrated, as well as the uses thereof, may be made by those skilled in the art without departing from the spirit of the present inventions. Hence, the scope of the present inventions should not be limited to the foregoing descriptions. Rather, the principles of the inventions may be applied to a wide range of methods, systems, and apparatuses, to achieve the advantages described herein and to achieve other advantages or to satisfy other objectives as well.

We claimed:

1. A method for estimating an uplink Signal to Interference and Noise Ratio (SINR) in a Multi-User Multiple Inputs Multiple Outputs (MU-MIMO) wireless communication system, the method comprising:
    transmitting, by a plurality of User Equipment (UEs), pilot signals in an uplink to a Base Station (BS), wherein the pilot signals of more than one UEs are multiplexed on same symbols;
    receiving, by the BS, the multiplexed pilot signals from the plurality of UEs;
    separating, by the BS, the pilot signals for each UE of the plurality of UEs using frequency sections and/or cyclic shift of a root sequence;
    obtaining, by the BS, channel coefficients between each receiving antenna of the BS and each transmitting antenna of the plurality of UEs in the uplink using the separated pilot signals for each UE; and,
    using the obtained channel coefficients, by the BS to obtain an estimate of a Single-User Multi-User Multiple Inputs Multiple Outputs (SU-MIMO) SINR of each UE of the plurality of UEs, wherein the estimate of the SU-MIMO SINR of each UE is positively correlated to an estimate of a channel gain using the channel coefficients and wherein the estimate of the SU-MIMO SINR of each UE of the plurality of UEs is negatively correlated to an estimate of a noise and interference power of each UE of the plurality of UEs in the MU-MIMO wireless communication system.

2. The method in claim 1 further comprising a UE transmitting pilot signals in more than one continuous OFDM symbols in the uplink.

3. The method in claim 2 further comprising the BS estimating the channel coefficients between each transmitting and receiving antenna pair at plural of subcarriers of continuous pilot symbols after receiving the pilot signals and compensating a time offset and a frequency offset.

4. The method in claim 1 further comprising the BS estimating a noise level of the estimated channel coefficients by averaging a difference between any two coefficients at a same subcarrier belonging to different pilot symbols over multiple antenna pairs.

5. The method in claim 1 further comprising the BS estimating a noise level of estimated channel coefficients by averaging a difference between two coefficients at two continuous subcarriers belonging to a same pilot symbol.

6. The method in claim 1 further comprising the BS calculating an uplink pilot SINR with an estimated power level of the channel coefficients and a power level of a noise.

7. The method in claim 1 further comprising calculating an uplink pilot SU-MIMO SINR with estimated channel coefficients and noise power levels.

8. The method in claim 1 further comprising calculating SU-MIMO SINR for uplink data transmission by adding an offset to the uplink pilot SU-MIMO SINR.

9. The method in claim 1 further comprising calculating the SU-MIMO SINR for downlink data transmission by adding an offset to the uplink pilot SU-MIMO SINR or the SU-MIMO SINR for uplink data transmission.

10. The method in claim 1 further comprising calculating error level of an uplink estimated channel with an estimated channel coefficient power level and a noise power level.

11. A method for estimating a channel estimation error level in a Multi-User Multiple Inputs Multiple Outputs (MU-MIMO) wireless communication system, the method comprising:
    transmitting, by a plural of User Equipment (UEs), pilot signals in an uplink to a Base Station (BS) wherein the pilot signals of more than one UEs are multiplexed on the same symbols;
    receiving, by the BS, the multiplexed pilot signals from the plural of UEs;
    separating, by the BS, the pilot signals for each UE of the plural of UEs using frequency sections and/or cyclic shift of a root sequence;
    obtaining, by the BS, channel coefficients between each receiving antenna of the BS and each transmitting antenna of the plural of UEs in the uplink using the separated pilot signals of each UE of the plural of UEs; and using the obtained channel coefficients, by the BS, to obtain an estimate of the channel estimation error level of each UE of the plural of UEs using both the channel coefficients and an estimated noise level of each UE of the plural of UEs, wherein a Channel State Information (CSI) error level is used to measure how much an estimated channel vector of each UE of the plural of UEs deviates from an ideal vector.

* * * * *